UNITED STATES PATENT OFFICE.

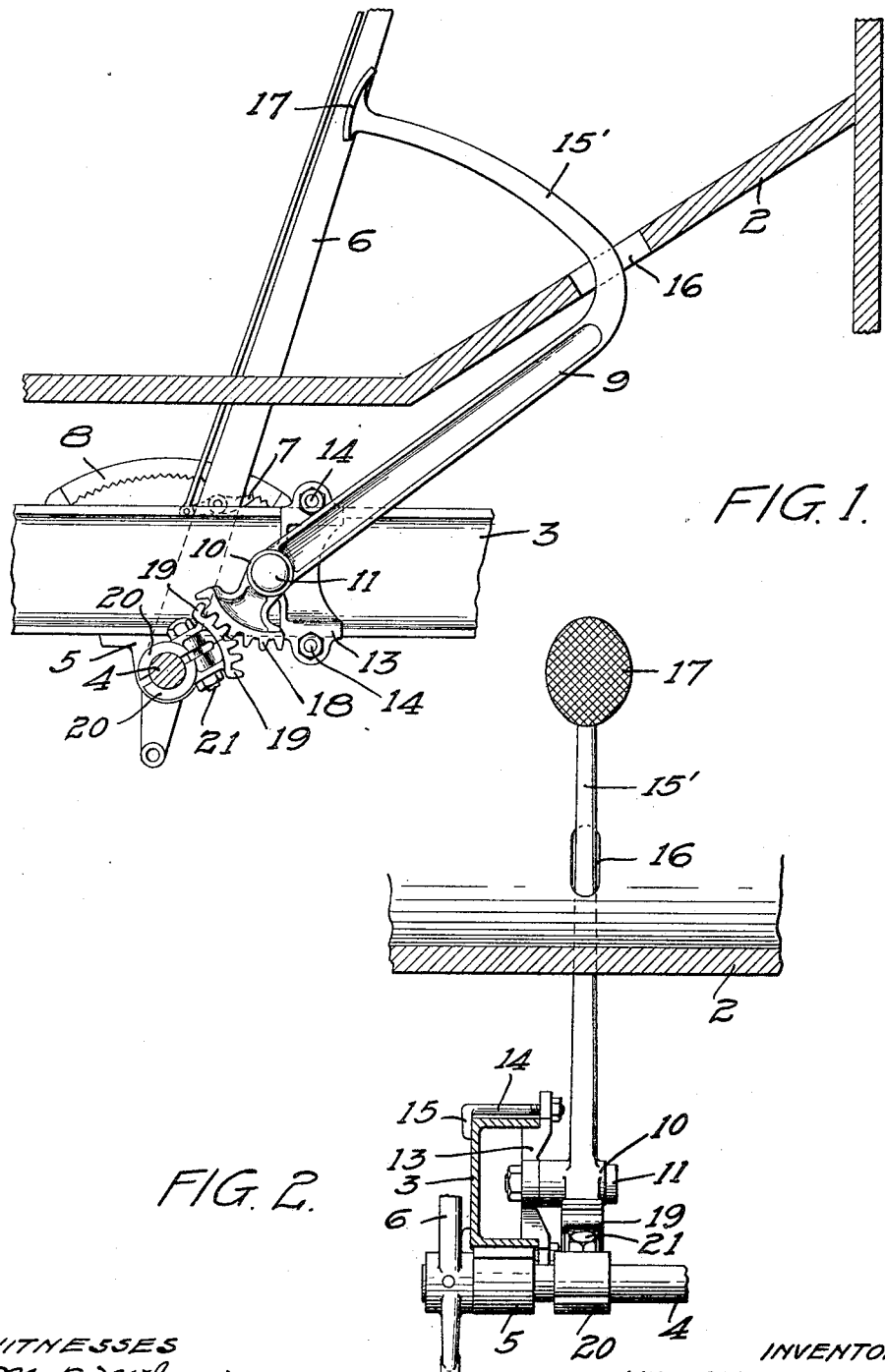

WILLIAM L. WATSON, OF McKENZIE, NORTH DAKOTA.

CONTROL MECHANISM.

1,130,227. Specification of Letters Patent. Patented Mar. 2, 1915.

Application filed January 30, 1914. Serial No. 815,369.

*To all whom it may concern:*

Be it known that I, WILLIAM L. WATSON, a citizen of the United States, resident of McKenzie, county of Burleigh, State of North Dakota, have invented certain new and useful Improvements in Control Mechanism for Automobiles, of which the following is a specification.

My invention relates to a mechanism for throwing the clutch out of gear and setting the emergency brake of an automobile, and is designed particularly for use with a "Ford" or similar car, in which a control lever is provided that necessitates the driver of the car leaning forward to grasp the lever and throw it backward to release the clutch and set the brake.

The object of my invention is to provide an attachment for this or similar type of car by means of which the driver can throw this control lever from its forward to its backward position by a foot operated mechanism, thereby avoiding the necessity of removing the hand from the steering wheel to shift the lever.

Other objects of the invention will appear from the following detailed description.

The invention consists generally in various constructions and combinations, all as hereinafter described and particularly pointed out in the claims.

In the accompanying drawings forming part of this specification, Figure 1 is a detail sectional view, illustrating the application of my invention to the frame of a car, known as the "Ford Model T". Fig. 2 is a transverse sectional view of the same.

In the drawing, 2 represents the foot board of the car, and 3 a portion of a side rail on one side of the car. This rail is usually made of channel bar, as indicated in Fig. 2. 4 is the shaft of the controlling mechanism, having a bearing 5 and provided with an operating lever 6 which projects upwardly above the foot board in position to be grasped by the driver of the car. This lever is provided with the usual dog 7, adapted to engage the teeth of a curved rack bar 8. When this lever is thrown forward in driving the car, it is necessary for the person at the wheel to remove one hand, lean forward to reach the lever, and go through the motion of throwing the lever to its backward position to disengage the clutch and set the brake. The driver not only loses considerable time by this operation, but in removing his hand from the steering wheel and leaning forward he temporarily loses sight of the road in front of the car and must guide the machine with one hand. Sometimes the car has to be stopped almost instantly, to avoid a collision and the driver has no time to reach forward and throw the lever to its braking position. To avoid this danger in operating the car, particularly of the Ford type, and also to allow the driver to sit upright with both hands on the steering wheel, I provide a foot operated mechanism for throwing the control lever from its forward to its backward position. This control mechanism consists of a lever 9 having a hub 10 that is pivotally supported by a bolt 11 carried by a plate 13. This plate is seated between the flanges of the channel bar 3 and is secured to said channel bar at the top and bottom by bolts 14 having heads 15 to bear on the face of the channel bar and lock the plate 13 securely against the flanges of this bar. This construction allows the attachment to be easily and quickly mounted on a car without cutting or damaging the frame or body of the car, it only being necessary to use an ordinary wrench for tightening the nuts of the bolts 14.

One end of the lever 9 has an extension 15' at right angles substantially to the main portion of the lever and projecting through an opening 16 in the foot board and terminating in a foot piece 17 within convenient reach of the driver's foot. The lower end of the lever 9 has a rock bar 18 formed thereon that is adapted to engage the teeth of a two-pieced curved rack 19 carried by jaws 20 which are clamped on the shaft 4 by means of a bolt 21. This bolt, when loosened, will allow the jaws to be adjusted in any desired position on the shaft to accommodate the teeth of the lever 9.

When the driver applies his foot to the part 17, the lever 9 may be rocked, throwing the rack 19 in the opposite direction and rocking the shaft 4 to throw the lever 6 from its forward driving position to its rear or locking position. This movement of the lever will also throw out the clutch and enable the driver to stop the car without removing his hands from the steering wheel.

A particular advantage of this device lies in the fact that it can be easily and quickly attached to the frame of a car after the car is set up and ready for use, or after it has been sold and used. The manner of mounting the lever on the frame allows for the convenient adjustment of the device for the throw desired, and by means of the adjustable jaws and the toothed racks can be set in proper engaging position.

In various ways the details of construction herein shown and described may be modified and still be within the scope of my invention.

I claim as my invention:

1. The combination, with a channel bar side rail, of a plate seated in said channel bar between the flanges of said rail, bolts having heads engaging the inner wall of said rail for locking said plate thereon, a lever having a hub pivotally supported on said plate and provided with an upwardly projecting part terminating in a pedal, a control shaft, an operating lever mounted thereon, and operative connections between said first named lever and said shaft for throwing said shaft lever from its forward to its backward position when said first named lever is depressed.

2. The combination, with an automobile frame, of a foot board mounted thereon, a shaft journaled in said frame beneath said board, a control lever mounted on said shaft and projecting upwardly through said board, a toothed rack carried by said shaft, a foot operated lever having one arm journaled in said frame beneath said foot board and provided with a toothed rack meshing with said first named rack, the other arm of said foot operated lever projecting upwardly through said foot board, the depression of said foot operated lever rocking said control lever shaft and lever, said toothed racks having a relative rotary adjustment, for the purpose specified.

3. The combination, with an automobile frame, of a foot board mounted thereon, a shaft journaled in said frame beneath said foot board, a control lever mounted on said shaft and projecting upwardly through said foot board, jaws clamped on said shaft and having a rotary adjustment thereon and provided with a toothed rack, an L-shaped lever having one arm journaled in said frame and provided with a toothed rack adjacent to its bearing meshing with said first named rack, the other arm of said L-shaped lever projecting upwardly through said foot-board, the adjustment of said jaws regulating the engagement of the teeth of said racks, the depression of said L-shaped lever rocking said control lever shaft and lever.

4. The combination, with an automobile frame, of a foot board mounted thereon, a shaft journaled in said frame, a control lever mounted on said shaft and projecting upwardly therefrom, jaws clamped on said shaft and having a rotary adjustment thereon and provided with a toothed rack, a lever journaled in said frame and having one arm provided with a toothed rack to mesh with the rack of said jaws, the other arm of said lever projecting upwardly through said foot board, the adjustment of said jaws regulating the adjustment of the teeth of said racks and the depression of said rack lever rocking said control lever shaft and lever.

In witness whereof, I have hereunto set my hand this 23d day of January, 1914.

WILLIAM L. WATSON.

Witnesses:
PARK E. WOOD,
S. R. DAY.

Copies of this patent may be obtained for five cents each, by addressing the "Commissioner of Patents, Washington, D. C."